(12) United States Patent
McGrath et al.

(10) Patent No.: US 8,016,560 B2
(45) Date of Patent: Sep. 13, 2011

(54) WIND TURBINE ROTOR BLADE WITH ACTUATABLE AIRFOIL PASSAGES

(75) Inventors: Edward Lee McGrath, Greer, SC (US);
Jonathan Glenn Luedke, Simpsonville, SC (US); Thomas Joseph Fischetti, Simpsonville, SC (US); Jing Wang, Simpsonville, SC (US); Stefan Herr, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/884,565

(22) Filed: Sep. 17, 2010

(65) Prior Publication Data

US 2011/0142638 A1 Jun. 16, 2011

(51) Int. Cl.
*F01D 5/14* (2006.01)
*F03D 7/04* (2006.01)

(52) U.S. Cl. ....... 416/91; 416/41; 416/90 A; 416/231 B; 416/231 R

(58) Field of Classification Search ............ 416/91, 416/41, 231 B, 90 A, 231 R
See application file for complete search history.

(56) References Cited

U.S. PATENT DOCUMENTS

| 3,144,220 | A | * | 8/1964 | Kittelson | 244/203 |
|---|---|---|---|---|---|
| 5,447,412 | A | * | 9/1995 | Lamont | 415/4.2 |
| 5,637,812 | A | * | 6/1997 | Baker et al. | 73/865.6 |
| 5,652,563 | A | * | 7/1997 | Maus | 340/290 |
| 5,697,468 | A | * | 12/1997 | Russell et al. | 180/116 |
| 6,984,110 | B2 | | 1/2006 | Jang | |
| 7,354,247 | B2 | * | 4/2008 | Bonnet | 416/90 R |
| 7,400,057 | B2 | | 7/2008 | Sureshan | |
| 2010/0135802 | A1 | * | 6/2010 | Yeh | 416/91 |

* cited by examiner

*Primary Examiner* — Ninh H Nguyen
*Assistant Examiner* — Liam McDowell
(74) *Attorney, Agent, or Firm* — Dority & Manning, P.A.

(57) ABSTRACT

A wind turbine rotor blade includes a pressure side and a suction side. At least one airfoil passage is defined through the blade between the pressure side and suction side. A respective cover is configured over the airfoil passage at each of the pressure and suction sides. The covers are actuatable between a closed position wherein the cover is flush with the respective pressure or suction side and an open position wherein the cover moves to open the airfoil passage.

9 Claims, 5 Drawing Sheets

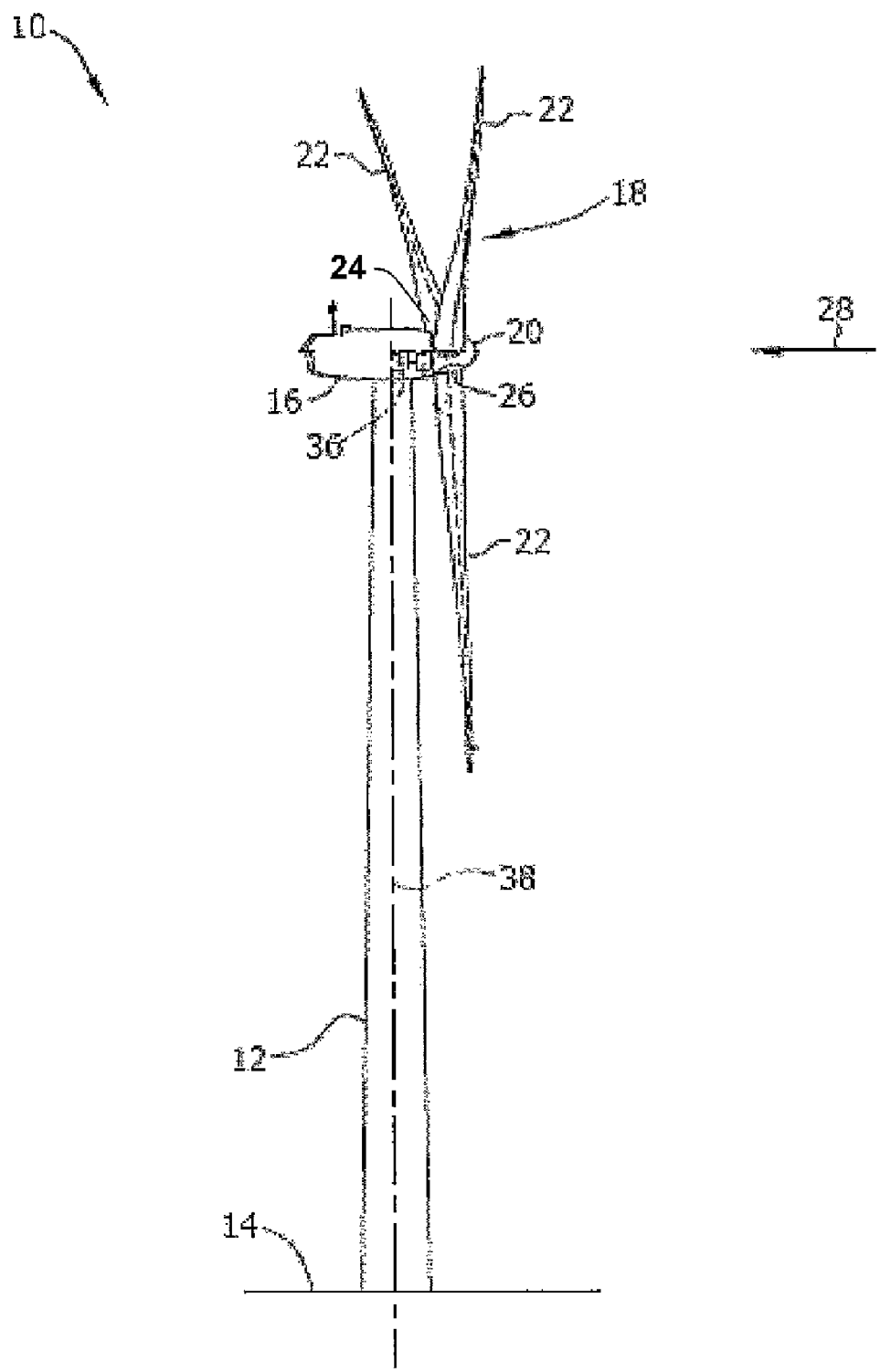
-FIG. 1-
PRIOR ART

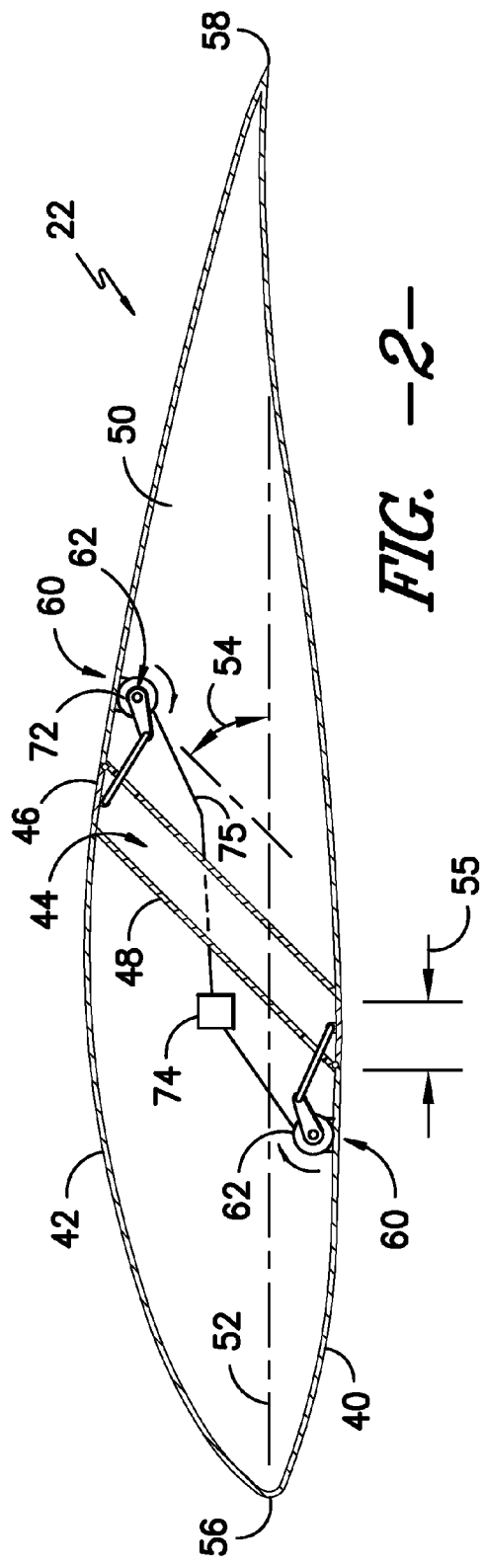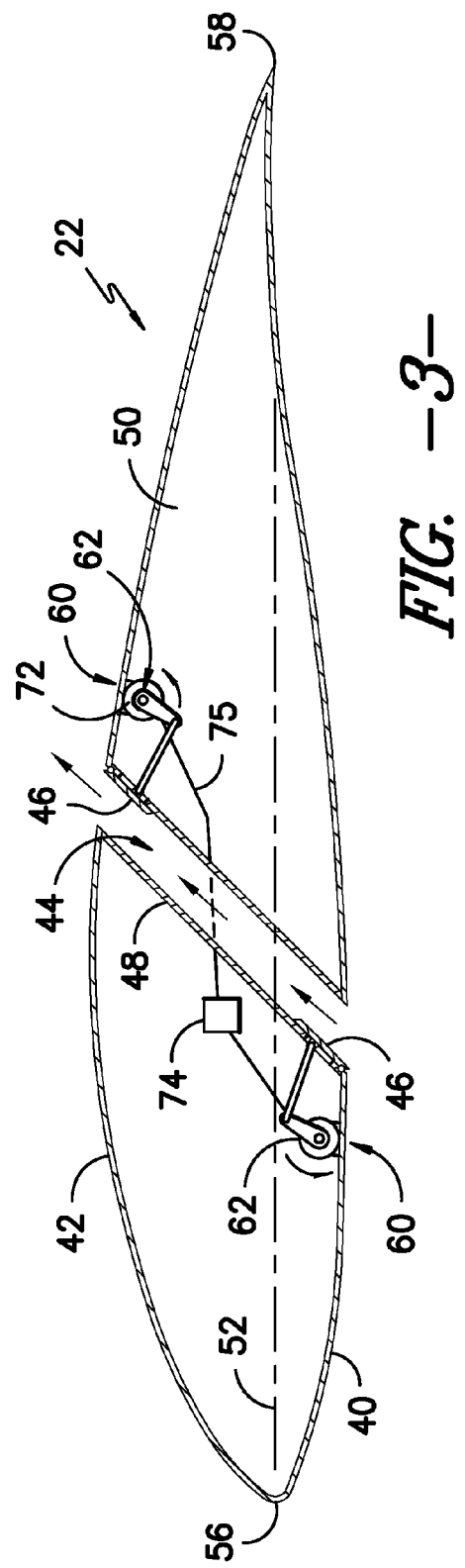

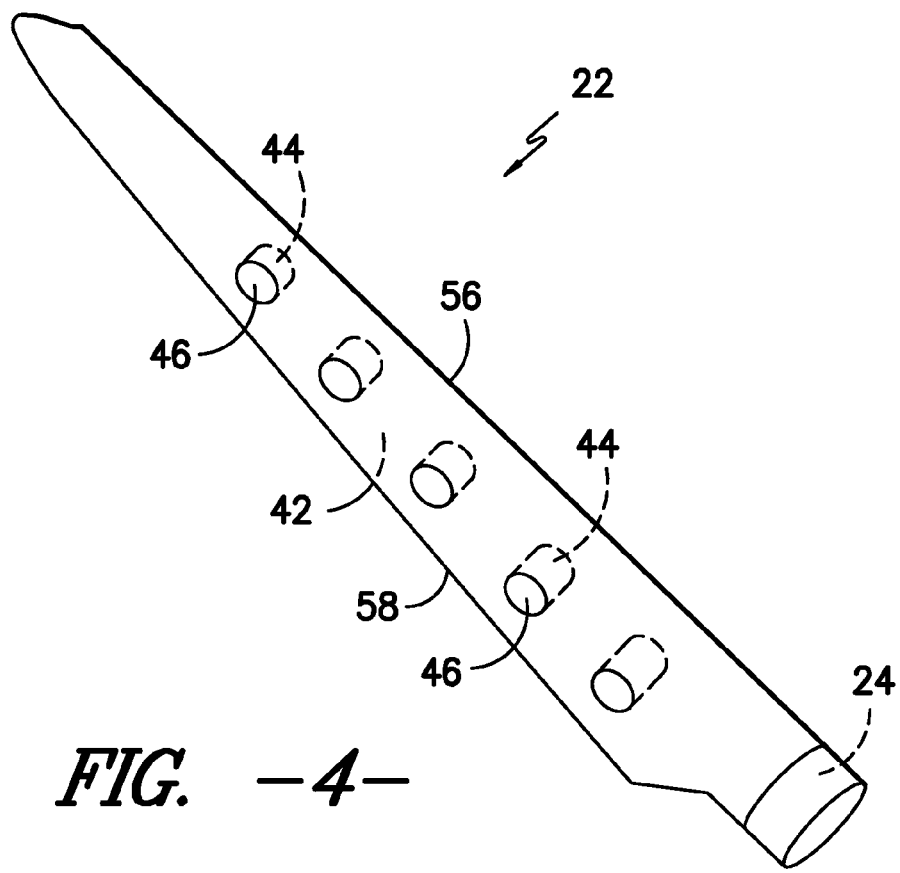
FIG. -4-
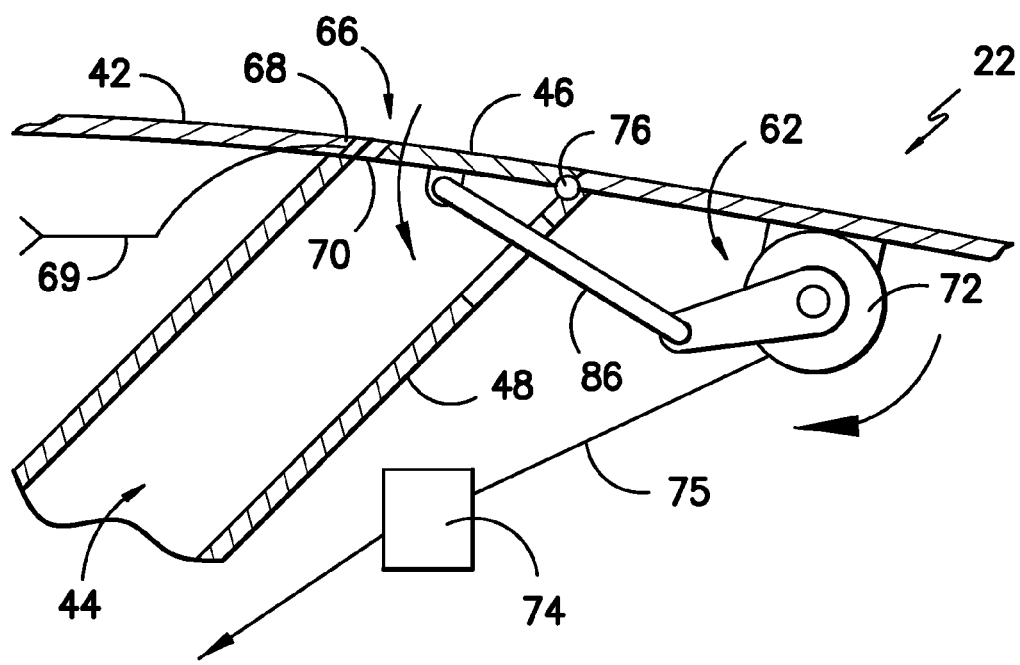
FIG. -5-

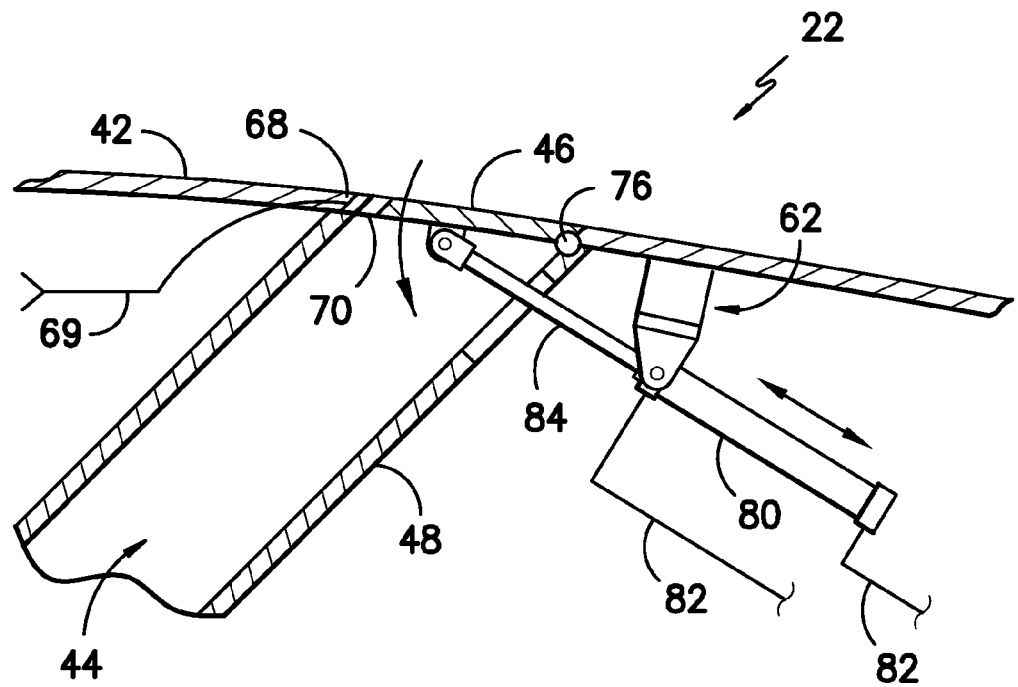
FIG. -6-
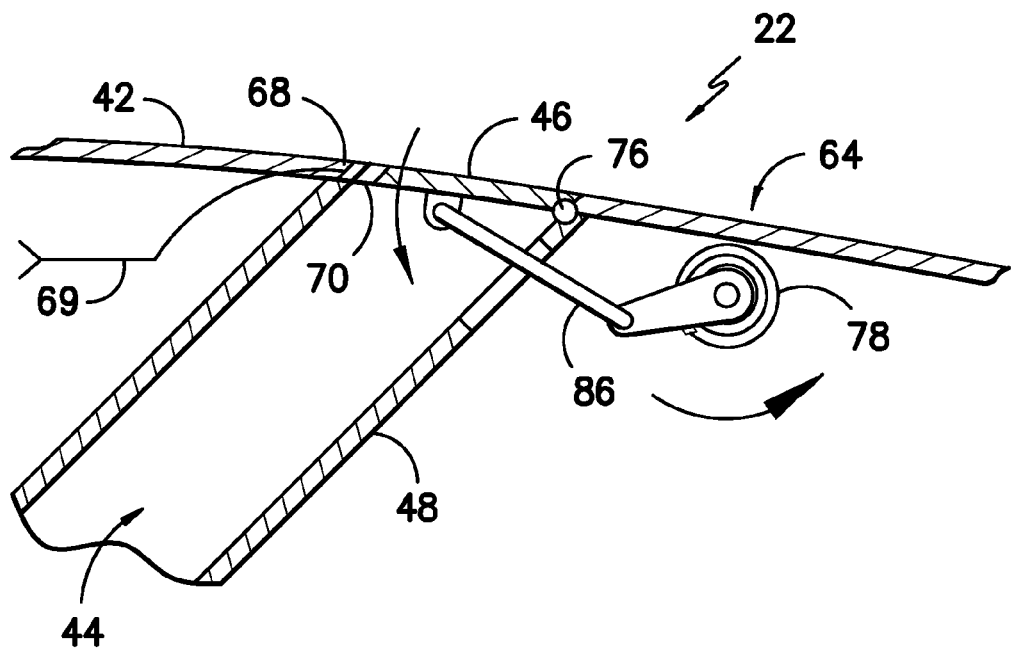
FIG. -7-

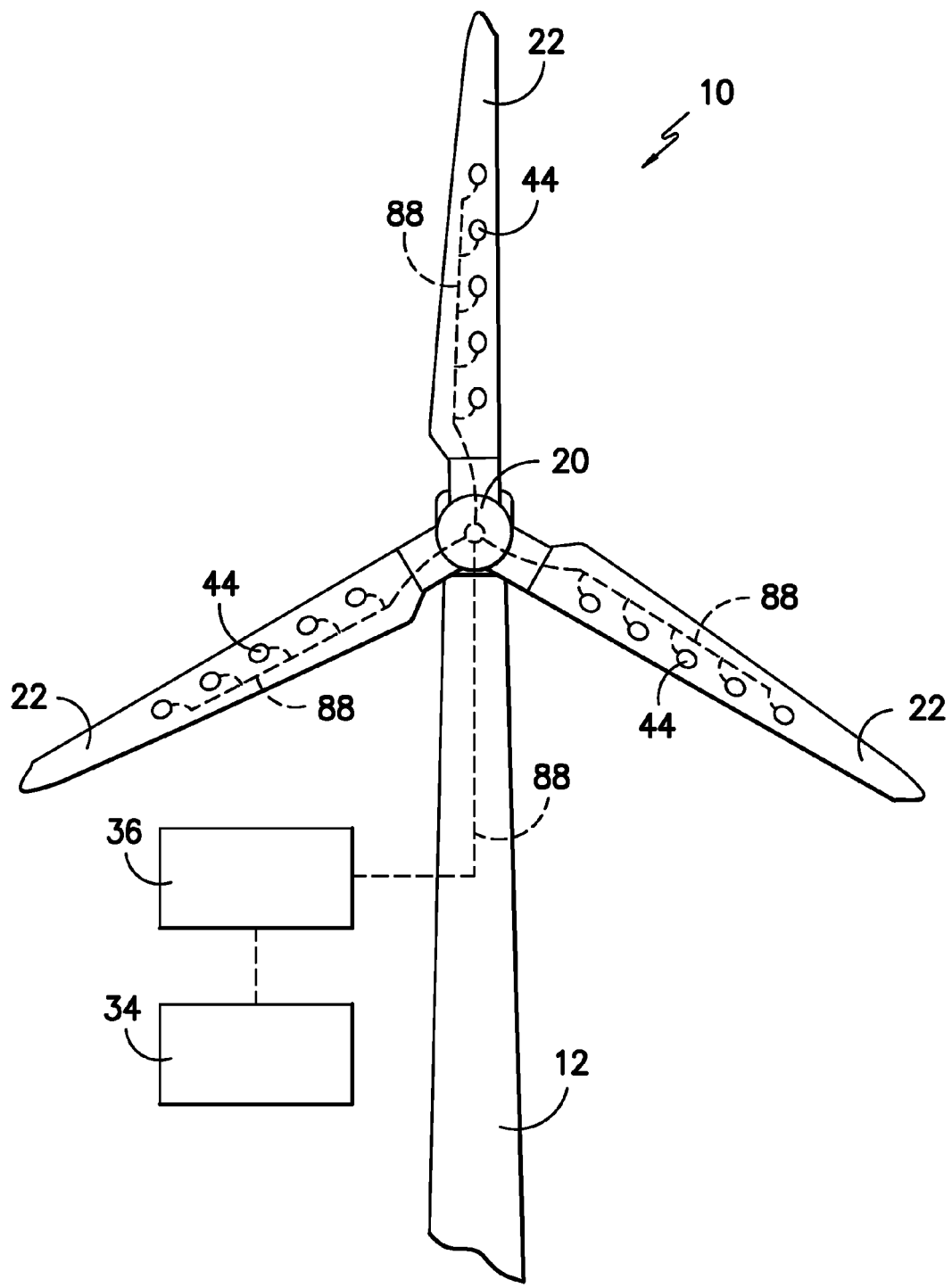
FIG. -8-

WIND TURBINE ROTOR BLADE WITH ACTUATABLE AIRFOIL PASSAGES

FIELD OF THE INVENTION

The present subject matter relates generally to wind turbines, and particularly to turbine rotor blades having controllable airfoil passages for load control considerations.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length and surface area of the rotor blades. However, the magnitude of deflection forces and loading of a rotor blade is generally a function of blade length, along with wind speed, turbine operating states, blade stiffness, and other variables. This increased loading not only produces fatigue on the rotor blades and other wind turbine components but may also increase the risk of a sudden catastrophic failure of the rotor blades, for example when excess loading causes deflection of a blade resulting in a tower strike.

Load control is thus a crucial consideration in operation of modern wind turbines. Active pitch control systems are widely used to control the load on the rotor blades by varying the pitch of the blades. However, in high wind conditions, it is often difficult to adjust the pitch angle of the blades due to increased wind resistance and the response rate of the pitch control system.

It is also known to vary the aerodynamic characteristics of the individual rotor blades as a means of load control, for example with controllable vortex elements, flaps, tabs, and the like configured on the blade surfaces.

U.S. Pat. No. 6,984,110 describes a system wherein the windmill blades are provided with wind pressure adjusting holes that are variably covered by adjustable plates configured on a side of the blade so as to slide within guides along the surface of the blade. A relatively complex mechanical actuating and control system is required to simultaneously adjust all of the plates on a single blade.

U.S. Pat. No. 7,400,057 describes an omni-directional vertically oriented wind turbine with toroid stacked blades. The blades include air bleed channels along the leading edge and concave surface of each toroid for the purpose of introducing high kinetic energy from the leading edge to the convex surface of the blade to reinforce the boundary layer and reduce air flow separation along the blade. These channels are open (uncovered) and play no meaningful role in load control on the blades.

Accordingly, the industry would benefit from a load control system and method for individual rotor blades that does not adversely affect the aerodynamic performance of the blade within design load constraints and is relatively easy to actuate under high load conditions.

BRIEF DESCRIPTION OF THE INVENTION

Aspects and advantages of the invention will be set forth in part in the following description, or may be obvious from the description, or may be learned through practice of the invention.

In one aspect, a wind turbine rotor blade is provided with a pressure side and a suction side. At least one airfoil passage is defined between the pressure side and the suction side. In a particular embodiment, the airfoil passage is defined by a channel member that extends within the internal cavity of the blade between the pressure and suction sides. A respective cover is configured over the airfoil passage at each of the pressure and suction sides such that each airfoil passage has an associated set of covers. Each cover is passively or actively actuatable between a closed position wherein the covers are flush with the respective pressure side or suction side and an open position wherein the covers move to open the airfoil passage. For example, the covers may pivot into the airfoil passage.

The blade may include one or more of the airfoil passages located at various positions or patterns on the blade. In a particular embodiment, the airfoil passages are located at a chord position on the pressure side and at an angle towards a trailing edge of the blade so that the member defining the passages runs in a straight linear path between the pressure and suction sides without passing through internal structural components of the blade, such as the spar caps or webs.

For the actively controlled cover embodiments, any manner of mechanical, electrical, hydraulic, pneumatic, or other suitable mechanism may be used to actively drive the covers between the closed and open position in response to a control signal received from the wind turbine controller. For example, an electric motor may be configured with each cover for this purpose. The covers may be variably positionable between the closed and fully open position to variably control the airflow through the passages.

In other embodiments, the covers may be passively controlled. For example, a biasing element such as a spring, piston, or the like, may be configured with each cover to bias the cover to the closed position and allow movement of the cover to the open position at a defined setpoint load condition experienced by the blade. So that the biasing element need not be precisely calibrated or unduly large, it may be desired to incorporate an actuatable lock with each cover, such as an electromagnetic lock, to maintain the cover in the closed position. At the setpoint load condition, the lock will release the cover, which will then move to the open position against the force of the biasing element. The biasing element may have sufficient strength to maintain or return the cover to the closed position at the same or a different setpoint load condition. In an alternate embodiment, the biasing element has insufficient strength to maintain or return the cover to the closed position at the setpoint load condition, whereby the pitch of the blades can be changed to unload the blades to a point whereby the biasing element will return the covers to the closed position.

It should be appreciated that the blades may include a plurality of the airfoil passages, with each passage being independently controlled. In this manner, any combination of the airfoil passages may be actuated depending on the load conditions on the blade. In order to maintain the overall balance of the wind turbine blades, the same relative airfoil passages will be actuated to the same degree on each of the blades in either of the active or passive actuation modes.

In still another embodiment, a wind turbine rotor blade includes a pressure side and a suction side. A plurality of independently actuatable airfoil passages are defined between the pressure side and the suction side. The airfoil passages may also be variably actuatable. With this configuration, any combination or number of the airfoil passages are actuatable along the length of the blade. In this embodiment, respective covers may be configured over the airfoil passages at each of the pressure and suction sides. The sets of covers are actuatable between a closed position wherein the covers are flush with the respective pressure side or suction side and an open position wherein the covers are moved to open the airfoil passage, for example by pivoting into the airfoil passages.

The invention also encompasses a wind turbine having one or more turbine blades configured with the active or passively actuated airfoil passages as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a conventional wind turbine;

FIG. 2 illustrates a cross-sectional view of a rotor blade with an airfoil passage in accordance with aspects of the invention;

FIG. 3 illustrates a cross-sectional view of the rotor blade of FIG. 2 with the airfoil passage in an actuated configuration;

FIG. 4 illustrates a perspective view of a rotor blade incorporating a plurality of airfoil passages;

FIG. 5 is a cross-sectional view of an embodiment of an airfoil passage cover actuating mechanism;

FIG. 6 is a cross-sectional view of an alternate embodiment of a cover actuating mechanism;

FIG. 7 is a cross-sectional view of still a further embodiment of a cover actuating mechanism; and, FIG. 8 is an illustration of a wind turbine with rotor blades in accordance with aspects of the invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring to the drawings, FIG. 1 illustrates a perspective view of a horizontal axis wind turbine 10. It should be appreciated that the wind turbine 10 may be a vertical-axis wind turbine. In the illustrated embodiment, the wind turbine 10 includes a tower 12 that extends from a support 14, a nacelle 16 mounted on the tower 12, and a rotor 18 that is coupled to the nacelle 16. The tower 12 may be fabricated from tubular steel or other suitable material and defines a cavity (not illustrated) between the support 14 and the nacelle 16. The rotor 18 includes a rotatable hub 20 and rotor blades 22 coupled to and extending radially outward from the hub 20. As shown, the rotor 18 includes three rotor blades 22. However, in an alternative embodiment, the rotor 18 may include more or less than three rotor blades 22.

The rotor blades 22 may generally have any suitable length that enables the wind turbine 10 to function according to design criteria. For example, the rotor blades 22 may have a length ranging from about 15 meters (m) to about 91 m. However, other non-limiting examples of blade lengths may include 10 m or less, 20 m, 37 m, or a length that is greater than 91 m. The rotor blades 22 are spaced about the hub 20 to facilitate rotating the rotor 18 to enable kinetic energy to be transferred from the wind into usable mechanical energy, and subsequently, electrical energy. Specifically, the hub 20 may be rotatably coupled to an electric generator (not illustrated) positioned within the nacelle 16 for production of electrical energy. Further, the rotor blades 22 may be mated to the hub 20 by coupling a blade root portion 24 to the hub 20 at a plurality of load transfer regions 26. Thus, any loads induced to the rotor blades 22 are transferred to the hub 20 via the load transfer regions 26.

As shown in the illustrated embodiment, the wind turbine may also include a turbine control system or turbine controller 36 located within the nacelle 16. However, it should be appreciated that the controller 36 may be disposed at any location on or in the wind turbine 10, at any location on the support 14, or generally at any other suitable location. The controller 36 may include suitable processors and/or other processing functionality configured to perform the methods, steps, operations, calculations and the like described herein. For example, in one embodiment, the controller 36 may be configured as a computer or other central processing unit. Further, the controller 36 may also include various input/output channels and/or devices for receiving inputs from sensors and other measurement devices and for sending control signals to various components of the wind turbine.

By executing wind turbine control commands, the controller 36 may generally be configured to control the various operating modes of the wind turbine 10 (e.g., start-up or shut-down sequences). The controller 36 may also be configured to control the blade pitch or pitch angle of each of the rotor blades 22 (i.e., an angle that determines a perspective of the rotor blades 22 with respect to the direction 28 of the wind) to control the load and power generated by the wind turbine 10 by adjusting an angular position of at least one rotor blade 22 relative to the wind. For instance, the controller 36 may control the pitch angle of the rotor blades 22, either individually or simultaneously, by transmitting suitable control signals to a pitch drive or pitch adjustment system within the nacelle 16. Further, as the direction 28 of the wind changes, the controller 36 may be configured to control the position of the nacelle 16 relative to a yaw axis 38 via a yaw drive mechanism within the nacelle 16 to position the rotor blades 22 with respect to the direction 28 of the wind.

During operation of the wind turbine 10, wind strikes the rotor blades 22 from the direction 28, which causes the rotor 18 to rotate. As the rotor blades 22 are rotated and subjected to centrifugal forces, the rotor blades 22 are also subjected to various loading forces and bending moments. As aerodynamic loads increase, excessive forces and bending moments can cause one or more of the rotor blades 22 to strike the tower 12 resulting in significant damage and downtime. However, even without a tower strike, excessive loading and bending moments can cause significant fatigue on the rotor blades 22 and other wind turbine components.

FIGS. 2 and 3 represent an embodiment of a wind turbine rotor blade 22 that incorporates aspects of the invention. The rotor blade 22 includes a pressure side 40 and a suction side 42. The sides 40, 42 are joined at a leading edge 56 and a trailing edge 58. An internal cavity 50 is defined within the blade 22 wherein any manner of structure, control devices, and the like may be located. For example, although not illustrated in the figures, the rotor blade 22 would typically incorporate structural support members such as a longitudinally extending web and respective spar caps attached to the inner surfaces of the pressure side 40 and suction side 42. It should also be appreciated that the rotor blade 22 is not limited to any particular shape or configuration, and that the blades illustrated in the present figures are not meant as a limitation on the overall design and configuration of the blades.

The rotor blade 22 includes at least one airfoil passage 44 that extends through the blade 22 between the pressure side 40 and suction side 42. The airfoil passage 44 is defined through the internal cavity 50 by any manner of suitable channel member or structure 48. For example, in the illustrated embodiment, the channel member 48 is a tubular component that extends between the pressure side 40 and suction side 42 and defines a passage for flow of air from the pressure side 40, through the internal cavity 50 and out through the suction side 42, as illustrated in FIG. 3. It should be appreciated that the channel member 48 may have any desired cross-sectional shape.

Location and orientation of the airfoil passage 44 can vary widely depending on any number of factors such as blade configuration and aerodynamic profile, length and location along the longitudinal axis of the blade, the loading conditions experienced by the blade, and so forth. In a particular embodiment depicted in FIG. 2, the airfoil passage 44 is oriented at an angle 54 relative to a blade chord 52 such that the airfoil passage 44 angles away from the leading edge 56 towards the trailing edge 58 at the angle 54. Relative position of the airfoil passage 44 relative to the chord 52 may also vary. The angle 54 and chord position may be selected so that the channel member 48 runs in a straight linear path between the pressure and suction sides and does not pass through the internal structural members of the blade, such as the spar caps or webs.

Referring still to FIGS. 2 and 3, the airfoil passage 44 includes a respective cover 46 at each of the pressure side 40 and suction side 42. Each cover 46 is has a closed position illustrated in FIG. 2 wherein the covers 46 are essentially flush with their respective sides 40, 42 so as to conform to the overall aerodynamic shape of the sides 40, 42. Thus, in the closed position of the covers 46, the aerodynamic performance of the rotor blade 22 is essentially unchanged by the presence of the airfoil passage 44.

Referring to FIG. 3, the covers 46 are each respectively actuatable to an open position wherein the covers 46 move to open the airfoil passage 44. In a particular embodiment, the covers 46 are caused to pivot into the channel member 48. In alternate embodiments, the covers 46 may slide relative to the pressure and suctions sides, or retract into the channel member 48. It should be appreciated that any manner of movement of the covers 46 is within the scope and spirit of the invention. In the fully or partially open position of the covers 46, a passage is created through the blade 22 for impingement air acting on the pressure side 40 of the blade 22. It should thus be appreciated that, in an extreme or transient load condition on the blade 22, the covers 46 may be actuated to the open position illustrated in FIG. 3 to reduce the load on the blade.

The covers 46 may be actuated by any manner of suitable control mechanism 60. A respective control mechanism 60 may be associated with each cover 46 so that the covers are independently actuated. Alternatively, the set of covers 46 may be controlled in unison for a respective airfoil passage 44. For example, as illustrated in FIGS. 2 and 3, the control mechanisms 60 are actuated in unison by a common controller/power source 74 and associated transmission lines 75. The control mechanisms 60 may also be configured to variably open the covers 46 between the closed and fully open position so that the volumetric flow rate of impingement air through the channel member 48 can be variably controlled.

FIG. 4 depicts a longitudinal aspect of a rotor blade 22 that incorporates a plurality of the airfoil passages 44 therein. It should be appreciated that any number of airfoil passages 44 may be configured along the blade in any desired pattern. The airfoil passages 44 may be independently actuated so that any number or combination of the passages 44 may be actuated as a function of varying load conditions experienced by the blade. For example, under a certain load condition, it may be desired to only actuate the radially outermost one or two of the airfoil passages 44, while at a different load condition it may be desired to actuate all of the airfoil passages 44. Alternatively, the plurality of airfoil passages 44 may be commonly controlled so as to be actuated in unison.

As mentioned, the control mechanism 60 actuating the covers 46 between the open and closed positions can vary widely within the scope of the invention. In a particular embodiment, the control mechanism 60 is an active control mechanism 62, as illustrated in FIGS. 2, 3, 5, and 7. In the embodiment of FIGS. 2, 3, and 5, the active control mechanism 62 incorporates a suitable electric motor 72 that is powered by a power supply 74 via transmission line 75. The motor 72 rotates in opposite directions to open and close the cover 46 via any manner of appropriate linkage 86. The covers 46 pivot into the channel member 48 via any manner of suitable pivot mechanism or hinge 76.

It should be appreciated that the power supply 74 for the motors 72 may be located at any suitable location within the wind turbine 10 and need not be located adjacent to the motors 72, or even within the blade 22. For example, the power supply 74 may be located with control equipment within the nacelle 16 and routed to the motors 72 through the hub 20 and appropriate control lines 88, as depicted in FIG. 8. Alternatively, the airfoil passages 44 may have individual respective power supplies 74 and associated control circuitry that is responsive to a control signal received by the wind turbine central controller 36.

FIG. 6 illustrates an alternative embodiment of an active control mechanism 62 that incorporates a piston 80 and rod 84 configuration. The piston 80 may be operated, for example, by hydraulics, pneumatics, or other motive force via lines 82 wherein the rod 84 moves the cover 46 between the open and closed positions depending on the direction of movement of the rod 84. The piston 80 may be supplied with its motive fluid from a central source that is common to all of the blades 22, or from a source that is provided for each respective blade 22.

In another embodiment, the piston 80/rod 84 may be configured as an electric solenoid.

The control mechanism 60 may also be a passive member that reacts to load conditions experienced by the blade 22. For example, referring to FIG. 7, a passive control mechanism 64 is illustrated as incorporating a biasing member 78, such as a torsion spring, leaf spring, and so forth, and appropriate linkage 86. The spring 78 may be designed to bias the door 46 to the closed position and to have a design spring constant (biasing force) that allows the door 46 to open at a defined load condition. When the load on the blade reduces to below the set point load condition, the biasing element 78 has sufficient strength to return the cover 46 to the closed position.

Referring to FIGS. 5 through 7 in particular, it may be desired in certain embodiments to incorporate a locking mechanism 66 between the covers 46 and their respective pressure side 40 or suction side 42. The locking mechanism 66 may be configured to ensure that the covers 46 remain in the closed position until the lock 66 is disengaged. In a particular embodiment, the lock 66 may be configured as an electromagnetic lock 68 that is controlled and powered via line 69. When the lock 68 is energized, it maintains the door 46 in the closed position. Upon de-energizing the lock 68, the door 46 is free to move to the open position. Control for the lock 68 may be coordinated with the actuation signal for the active control mechanisms 62. In the passive control mechanism embodiment of FIG. 7, the presence of the lock 68 reduces the strength needed for the biasing element or spring 78. For example, the spring 78 need only have sufficient strength to bias the cover 46 to the closed position in an essentially unloaded condition of the blade 22. Upon a set point load condition on the blade, the lock 68 is de-energized and the door 46 is moved to the open position by the load acting on the blade. Once the load condition has passed, the blade 22 can be feathered to a position that allows the spring 78 to return the cover 46 to the closed position, at which time the lock 68 is then energized to maintain the cover 46 in the closed position.

As mentioned, FIG. 8 depicts a wind turbine 10 wherein each of the rotor blades 22 incorporates a plurality of the airfoil passages 44. Control and/or power lines 88 are provided for a coordinated control of the various airfoil passages 44 via the wind turbine controller 36. The controller 36 may, in turn, receive any manner of input from various sensors 34 that are appropriately disposed and configured to sense various operating conditions on the blades 22, such as extreme or transient load conditions experienced by the blades 22. At such load conditions, the controller 36, via the power/control lines 88, can actuate any number or combination of the airfoil passages 44. In order to maintain the overall balance of the rotor 20 and blades 22, the same number and combination of airfoil passages 44 on each of the blades 22 are actuated in unison via their respective control mechanisms.

At the end of the transient load condition, the covers 46 are returned to their closed position. Desirably, a sensor 70 (FIGS. 5 through 7) is configured at the adjacent surfaces of the covers 46 and respective pressure side 40 or suction side 42 to detect the closed position of the cover 46 and signal the controller 36 accordingly. The sensor 70 may be any manner of position sensor, such as a make-or-break contact, reed switch, electromagnetic switch, and so forth. In the illustrated embodiment, the sensor 70 is incorporated as a component of the lock 66 (for example, a component of the electromagnetic lock 68) and may thus utilize the same power/control line 69 that is associated with the lock. The sensors 70 may be used to ensure that a uniform condition is established on all of the rotor blades 22. For example, in the event that one or more of the airfoil passages 44 is actuated during a transient load condition, it is important that the actuated passages 44 are uniformly returned to their normal closed operating state so that a rotor imbalance is not created. If the sensors 70 indicate that the covers 46 associated with one or more of the airfoil passages 44 have not closed, then the controller 36 may place the turbine in a stall or shutdown condition until the problem can be corrected.

It should be appreciated that the actuatable airfoil passages or wind turbine rotor blades as described herein offer unique advantages. Extreme load conditions often are the design limiting considerations with the result that a relatively few number of load conditions require the wind turbine to have a greater overall system cost for a design load capability. If the extreme load cases were reduced, then the overall system cost of the wind turbine can be correspondingly reduced. The actuatable airfoil passages as described herein provide a relatively cost efficient means for minimizing the impact of extreme load conditions by reducing the load variations created by the extreme load conditions, whereby the mean loading can be increased for a given system load capability. For example, longer rotor blades may be used to define a greater rotor sweep area if the actuatable airfoil passages are used to minimize the extreme load conditions that may be otherwise experienced by the longer rotor blades.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine rotor blade, comprising:
   a pressure side;
   a suction side;
   at least one airfoil passage defined between said pressure side and said suction side;
   a respective cover configured over said airfoil passage at each of said pressure side and said suction side, said covers actuatable between a closed position wherein said covers are flush with said respective pressure side or suction side and an open position wherein said covers are moved to open said airfoil passage;
   a control mechanism configured with said covers to move said covers between the open and closed positions; and
   an actuatable lock separate from said control mechanism and operably configured between said first cover and respective said pressure side or suction side to maintain said first cover in the closed position and to release said first cover upon receipt of a control signal at a setpoint load condition whereby said cover moves to the open position by action of the control mechanism.

2. The wind turbine rotor blade as in claim 1, further comprising a channel member disposed within an interior cavity of said blade between said pressure side and said suction side, said channel member defining said airfoil passage.

3. The wind turbine rotor blade as in claim 2, wherein said channel member is oriented at an angle from said pressure side to said suction side relative to a horizontal chord plane through said blade and at a chord position on said pressure side so that said channel member extends linearly between said pressure side and said suction side without passing through internal structural members of said blade.

4. The wind turbine rotor blade as in claim 1, wherein said covers pivot into said airfoil passage in the open position.

5. The wind turbine rotor blade as in claim 1, wherein said control mechanism associated with at least a first one of said covers is an active control mechanism configured to move said first cover between the open and closed positions in response to the control signal that also releases said lock, said first cover variably positionable between the open and closed positions.

6. The wind turbine rotor blade as in claim 1, wherein said control mechanism associated with at least a first one of said covers is a passive control mechanism including a biasing element to bias said first cover to the closed position and allow movement of said first cover to the open position at the setpoint load condition experienced by said blade.

7. The wind turbine rotor blade as in claim 6, wherein said biasing element has sufficient strength to return said first cover to the closed position at loads acting on said rotor blade up to the setpoint load condition.

8. The wind turbine rotor blade as in claim 6, wherein said biasing element has insufficient strength to maintain or return said first cover to the closed position with a load on said rotor blade, wherein said rotor blade is feathered to an unloaded condition wherein said biasing element moves said first cover to the closed position.

9. The wind turbine rotor blade as in claim 1, wherein said blade comprises a plurality of said airfoil passages and respective said sets of covers, each said set of covers being independently controlled.

\* \* \* \* \*